United States Patent [19]

Ashcroft et al.

[11] 4,151,153

[45] Apr. 24, 1979

[54] CROSS-LINKABLE FILLED POLYURETHANES BASED ON UNSATURATED CYCLOALIPHATIC DIISOCYANATE

[75] Inventors: Peter L. Ashcroft; John Crosby, both of Runcorn, England

[73] Assignee: Imperial Chemical Industries Limited, London, England

[21] Appl. No.: 802,967

[22] Filed: Jun. 2, 1977

[30] Foreign Application Priority Data

Jun. 11, 1976 [GB] United Kingdom ............... 24294/76

[51] Int. Cl.² ...................... C08G 18/81; C08G 18/86; C08G 18/87
[52] U.S. Cl. ........................... 260/37 N; 260/453 AP; 528/48; 528/50; 528/58; 528/74; 528/75; 528/83

[58] Field of Search ................ 260/453 AP, 77.5 AP, 260/77.5 AB, 75 NT, 77.5 AT; 528/74, 75

[56] References Cited

U.S. PATENT DOCUMENTS

| | | | |
|---|---|---|---|
| 2,846,416 | 8/1958 | Arnold et al. ................ | 260/77.5 AP |
| 2,929,800 | 3/1960 | Hill .............................. | 260/77.5 AM |
| 3,641,199 | 2/1972 | Niederhauser et al. ........ | 260/75 NP |
| 4,036,869 | 7/1977 | Crosby et al. ................ | 260/453 AP |

*Primary Examiner*—H. S. Cockeram
*Attorney, Agent, or Firm*—Cushman, Darby & Cushman

[57] ABSTRACT

Improved elastomers are made by cross-linking a polyurethane through double bonds derived from a diisocyanato bicyclo octene used together with a linear prepolymer to make the polyurethane.

6 Claims, No Drawings

CROSS-LINKABLE FILLED POLYURETHANES BASED ON UNSATURATED CYCLOALIPHATIC DIISOCYANATE

This invention relates to cross-linked polyurethanes. According to the present invention there is provided a cured polyurethane elastomer cross-linked by reaction between a cross-linking agent and ethylenically unsaturated groups in the polymer structure wherein the polyurethane comprises urethane-linked repeating units derived from a diisocyanato bicyclo octene and a linear pre-polymer with two isocyanate-reactable end groups.

The pre-polymer may be a compound containing a chemically stable linear chain and terminating in groups reactive to isocyanates for example hydroxyl or amino groups. The pre-polymer is preferably a polyether or a polyester and may conveniently be for example any of the aliphatic linear polyethers or polyesters commercially available, some being particularly designed for the production of polyurethanes. Especially preferred polymers include poly(ethylene adipate), poly(propylene adipate), poly(tetramethylene adipate), poly(hexamethylene adipate), poly(ethylene glycol), poly(propylene glycol) and poly(tetrahydrofuran). Mixtures of polymers may be used and also mixtures (or condensation products) of polymers and glycols (or other diols) may also be a convenient form of linear pre-polymer to use in this invention.

The diisocyanato bicyclo octene is preferably a bicyclo (3,3,0) octene having isocyanate groups on non-adjacent carbon atoms, especially the 6, 8 carbon atoms of the bicyclo (3,3,0) octene ring system for example the compound having the structure

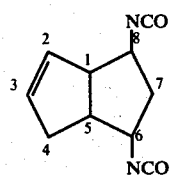

Spatial and configurational isomers are included within the definition of any preferred compound. Diisocyanato bicyclo octene may also be called "the diisocyanate from dicyclopentadiene furoxan" since it may be produced from dicyclopentadiene furoxan as described in U.S. Pat. No. 4,036,869. The 6, 8 diisocyanato bicyclo octene is conveniently prepared from the corresponding furoxan by thermolysis in the presence of sulphur dioxide or via the product of reaction of the furoxan with a vicinal diketone as described in U.S. Pat. No. 4,036,869 and U.S. application of Crosby, Ser. No. 781,869, filed Mar. 28, 1977.

It may be appreciated that the diisocyanate will react with the polyester or polyether prepolymer in order to form a polyurethane which will include chemically bound bicyclo octene rings. In the preparation of the polyurethane it is preferable to have a small excess of the linear pre-polymer and thereby minimise the chance of branching or cross-linking from urethane-isocyanate reactions. The residual unsaturation of the bicyclo octene is available for cross-linking and may conveniently be reacted with conventional curing agents for hydrocarbon elastomers, the most widely used examples of which are sulphur and peroxides. These two are preferred, especially sulphur and sulphur-based systems (including sulphur donors) for this invention; but other cross-linking agents reactable with hydrocarbon unsaturation may be used if desired.

Before cross-linking, the polyurethane is preferably a thermoplastic material and so may be subjected to fabrication procedures for example extrusion, injection moulding etc. in order to shape an article. The fabricated product may then be cross-linked by reaction with the unsaturated groups and for preference a cross linking agent is incorporated into the composition prior to the final fabrication of the product. The cross-linking may most conveniently be effected by heating the product, the heating preferably being sufficient to cure the polyurethane but not sufficient to deform the shape of the article. However the compositions of this invention may be cross-linked either during, before or after fabrication by choice of suitable curing agents and processing procedures, thus extending their versatility and wide utility as elastomeric products.

The cross-linked polyurethanes of this invention are generally elastomers having both a high tensile strength and a high value for elongation to break. The superiority of the new elastomers, as seen by these two properties over comparable polyurethanes cross-linked by means of the similar action of a cross-linking agent on double bonds introduced in the pre-polymer from the acid or polyol portions, is most marked for the unfilled elastomers. There is little need to use a reinforcing filler such as carbon black or fume silica with the polyurethanes of this invention because quite acceptable properties suitable for many applications may be achieved in a non-filled rubber. If it is desired to improve the properties of these new rubbers further, fillers may be incorporated but these, quite suitably, may be cheap fillers, for example calcium carbonate, titanium dioxide or coarse silica. For example a filler such as titanium dioxide may be used to significantly improve the modulus of the elastomer without causing the good elongation to break or tensile strength to suffer unduly.

The invention is illustrated but not limited by the following examples in which all parts and percentages are by weight. Tear strengths quoted in the Examples are "Graves" tear strengths.

EXAMPLE 1

Preparation of thermoplastic polyurethane

Polyethylene tetramethylene adipate (m. wt. 1950) (100 parts) was dried by heating at 80° C. at >5 mm Hg pressure for 30 minutes. 1,4-Butane diol (freshly redistilled and stored under dry nitrogen until used) (13.16 parts), dibutyl tin dilaurate catalyst (1500 ppm with respect to polyethylene tetramethylene diol) and diisocyanate (37.71 parts) were added. The mixture was shaken vigorously for about ½ minute than degassed for 5–10 minutes on a rotary evaporator at 70° C., >5 mm Hg. The mixture was cast into a preheated (100° C.) glass mould coated with a silicone release agent. The mould was sealed and heated at 110° C. for 1½ hours in a hot air oven to cure the urethane. Before removing the resulting thermoplastic urethane from the mould it was allowed to cool to room temperature.

The polyurethane prepared in Example 1 was the material used in all the other examples (called "the urethane").

EXAMPLE 2

Compression moulding of the urethane

The urethane was compression moulded at 125° C. for 15 minutes to give a product with the following properties. (In this and the following examples all the properties quoted were measured at ambient temperature):

| | |
|---|---|
| 100% modulus | 20 Kg cm$^{-2}$ |
| 300% modulus | 31 Kg cm$^{-2}$ |
| Tensile strength | 200 Kg cm$^{-2}$ |
| Elongation at break | 700% |
| Hardness | 75° (IRHD)* |

*international rubber hardness degrees

EXAMPLE 3

Curing the urethane

The urethane (100 parts) was mixed with zinc oxide (5 parts), sulphur (1.5 parts), zinc diethyldithiocarbamate (1.5 parts), and 2-mercaptobenzthiazole (0.5 parts). The mixing procedure used here and in all the following examples was that the elastomer was first milled on a two roll mill (initially at room temperature) until workable (approximately 40° C.); the other components were then added and milling was continued until they were well dispersed; total milling time being about 10 minutes.

The urethane compound was cured under pressure for 30 minutes at 125° C. to give a product with the properties:

| | |
|---|---|
| 100% modulus | 21.5 Kg cm$^{-2}$ |
| 300% modulus | 38 Kg cm$^{-2}$ |
| Tensile strength | >400 Kg cm$^{-2}$ |
| Elongation at break | >660% |
| Hardness | 75° (IRHD) |

EXAMPLE 4

Co-curing the urethane with an EPDM rubber

The urethane (50 parts) was mixed with an EPDM rubber "Intolan 155" (50 parts), HAF carbon black (25 parts), zinc oxide (5 parts), sulphur (1.5 parts), zinc diethyl dithiocarbamate (1.5 parts), and 2-mercaptobenzthiazole (0.5 parts). The mixture was cured under pressure for 20 minutes at 125° C. to give a product with the properties:

| | |
|---|---|
| 100% modulus | 21 Kg cm$^{-2}$ |
| 300% modulus | 73 Kg cm$^{-2}$ |
| Tensile strength | 152 Kg cm$^{-2}$ |
| Elongation at break | 490% |
| Hardness | 75° (IRHD) |

EXAMPLE 5

Preparation of a cross-linked urethane filled with carbon black

The formulation of Example 3 was prepared except that HAF carbon black (25 parts) was also added. The resulting rubber compound was compression moulded for 45 minutes at 125° C. to give an elastomer with the following properties:

| | |
|---|---|
| 100% modulus | 39 Kg cm$^{-2}$ |
| 300% modulus | 141 Kg cm$^{-2}$ |
| Tear strength | 93 Kg cm$^{-1}$ |
| Tensile strength | 360 Kg cm$^{-2}$ |
| Elongation at break | 610% |
| Hardness | 85° (IRHD) |

EXAMPLE 5A

The urethane alone (Example 1) (100 parts) and HAF carbon black (25 parts) were milled together and compression moulded at 125° C. for 10 minutes to give a product with the properties:

| | |
|---|---|
| 100% modulus | 61 Kg cm$^{-2}$ |
| 300% modulus | 160 Kg cm$^{-2}$ |
| Tear strength | 88 Kg cm$^{-1}$ |
| Tensile strength | 160 Kg cm$^{-2}$ |
| Elongation at break ca | 360% (yielded) |
| Hardness | 90° (IRHD) |

To this material was then added, by milling, a curing mixture comprising ZnO (5 parts), sulphur (1.5 parts), zinc diethyldithio-carbamate (1.5 parts) and 2-mercaptobenzthiazole (0.5 parts). The material was then compression moulded for a second time at 125° C. (for 20 minutes) to give a cured urethane with the following properties:

| | |
|---|---|
| 100% modulus | 68 Kg cm$^{-2}$ |
| 300% modulus | 195 Kg cm$^{-2}$ |
| Tear strength | 119 Kg cm$^{-1}$ |
| Tensile strength | 220 Kg cm$^{-2}$ |
| Elongation at break ca | 400% (yielded) |
| Hardness | 93° (IRHD) |

EXAMPLE 5B

The formulation of Example 3 was prepared except that HAF carbon black (50 parts) was also added. The resulting rubber compound was compression moulded for 30 minutes at 125° C. to give a cured urethane with the following properties:

| | |
|---|---|
| 100% modulus | 77 Kg cm$^{-2}$ |
| 300% modulus | 218 Kg cm$^{-2}$ |
| Tear strength | 129 Kg cm$^{-1}$ |
| Tensile strength | 271 Kg cm$^{-2}$ |
| Elongation at break | 525% |
| Hardness | 93° (IRHD) |

EXAMPLE 6

Preparation of a cross-linked blend of urethane and natural rubber

The formulation of Example 4 was used except that in place of the EPDM was used pale-crepe natural rubber. The resulting rubber compound was compression moulded for 10 minutes at 125° C. to give a product with the properties:

| | |
|---|---|
| 100% modulus | 24 Kg cm$^{-2}$ |
| 300% modulus | 95 Kg cm$^{-2}$ |
| Tensile strength | 190 Kg cm$^{-2}$ |
| Elongation to break | 540% |
| Hardness | 70° (IRHD) |

For comparison, a corresponding composition in which 100% of pale crepe were used instead of 50% pale crepe and 50% urethane had an elongation at break of only 350%.

EXAMPLE 7

Preparation of a cured urethane filled with titanium dioxide

The formulation of Example 3 was prepared except that it also contained uncoated filler-grade titanium dioxide (25 parts). The resulting compound was compression moulded at 125° C. for 30 minutes to give a product with the properties:

| | |
|---|---|
| 100% modulus | 20 Kg cm$^{-2}$ |
| 300% modulus | 48 Kg cm$^{-2}$ |
| Tensile strength | 400 Kg cm$^{-2}$ |
| Elongation at break | 690% |
| Hardness | 75° (IRHD) |

EXAMPLE 8

The urethane (100 parts) and uncoated filler grade titanium dioxide (25 parts) were milled together then compression moulded at 125° C. for 40 minutes to give a product with the properties.

| | |
|---|---|
| 100% modulus | 50 Kg cm$^{-2}$ |
| 300% modulus | 103 Kg cm$^{-2}$ |
| Tensile strength | 364 Kg cm$^{-2}$ |
| Elongation at break | 750% |

To this material was then added, by milling, a curing mixture comprising zinc oxide (5 parts), sulphur (1.5 parts) zinc diethyldithiocarbamate (1.5 parts) and 2-mercaptobenzthiazole (0.5 parts). The material was then compression moulded for a second time at 125° C. (for 30 minutes) to give a cured, filled urethane with properties:

| | |
|---|---|
| 100% modulus | 46 Kg cm$^{-2}$ |
| 300% modulus | 110 Kg cm$^{-2}$ |
| Tensile strength | 420 Kg cm$^{-2}$ |
| Elongation at break | 685% |
| Hardness | 75° (IRHD) |

EXAMPLE 9

The procedure of Example 8 was repeated except that 50 parts of TiO$_2$ were employed. The properties after pressing at 125° C. for the first time were:

| | |
|---|---|
| 100% modulus | 21 Kg cm$^{-2}$ |
| 300% modulus | 49 Kg cm$^{-2}$ |
| Tear strength | 51 Kg cm$^{-1}$ |
| Tensile strength | 220 Kg cm$^{-2}$ |
| Elongation at break | 690% |
| Hardness | 83 (IRHD) | and after addition of the curing mixture and pressing again at 125° C. the properties were:

| | |
|---|---|
| 100% modulus | 28 Kg cm$^{-2}$ |
| 300% modulus | 70 Kg cm$^{-2}$ |
| Tear strength | 66 Kg cm$^{-1}$ |
| Tensile strength | 350 Kg cm$^{-2}$ |
| Elongation at break | 630% |
| Hardness | 83° (IRHD) |

EXAMPLE 10

The procedure of Example 8 was repeated except that 100 parts of TiO$_2$ were employed. The properties after adding the curing mixture and pressing for the second time at 125° C. (for 40 minutes) were:

| | |
|---|---|
| 100% modulus | 45 Kg cm$^{-2}$ |
| 300% modulus | 110 Kg cm$^{-2}$ |
| Tear strength | 83 Kg cm$^{-1}$ |
| Tensile strength | 260 Kg cm$^{-2}$ |
| Elongation at break | 590% |
| Hardness | 85° (IRHD) |

EXAMPLE 11

The procedure of Example 8 was repeated except that instead of TiO$_2$, 25 parts of filler-grade calcium carbonate which was coated with calcium stearate ("Winnofil" S from ICI). The properties after pressing at 125° C. for the first time were:

| | |
|---|---|
| 100% modulus | 19 Kg cm$^{-2}$ |
| 300% modulus | 30 Kg cm$^{-2}$ |
| Tear strength | 37 Kg cm$^{-1}$ |
| Tensile strength | 245 Kg cm$^{-2}$ |
| Elongation at break | 750% |
| Hardness | 80° (IRHD) | and after adding the curing mixture and pressing again at 125° C. the properties of the cured product were:

| | |
|---|---|
| 100% modulus | 23 Kg cm$^{-2}$ |
| 300% modulus | 44 Kg cm$^{-2}$ |
| Tear strength | 47 Kg cm$^{-1}$ |
| Tensile strength | 350 Kg cm$^{-2}$ |
| Elongation at break | 660% |
| Hardness | 77° (IRHD) |

EXAMPLE 12(a)

The formulation of Example 3 was prepared except that Talc (25 parts) was also added. The resulting rubber compound was compression moulded for 30 minutes at 125° C. to give a filled, cross-linked urethane with the following properties:

| | |
|---|---|
| 100% modulus | 32 Kg cm$^{-2}$ |
| 300% modulus | 54 Kg cm$^{-2}$ |
| Tear strength | 55 Kg cm$^{-1}$ |
| Tensile strength | 324 Kg cm$^{-2}$ |
| Elongation at break | 625% |
| Hardness | 82° (IRHD) |

EXAMPLE 12(b, c, d)

The formulation of Example 3 was prepared except that fume silica was added in varying amounts. The resulting urethane compounds were compression moulded at 125° C. to give filled, cross-linked products with the following properties:

| | | 12b | 12c | 12d |
|---|---|---|---|---|
| pts. silica | | 25 | 50 | 100 |
| cure time (min) | | 45 | 25 | 40 |
| 100% modulus | (Kg cm$^{-2}$) | 28 | 65 | 140 |
| 300% modulus | (Kg cm$^{-2}$) | 70 | 122 | 150 |
| Tensile strength | (Kg cm$^{-2}$) | 451 | 340 | 150 |
| Tear strength | (Kg cm$^{-1}$) | 77 | 115 | 127 |
| Elongation at break | (%) | 640 | 560 | 300 |

| | | 12b | 12c | 12d |
|---|---|---|---|---|
| Hardness | (° IRHD) | 84 | 91 | 98 |

EXAMPLE 12(e)

The formulation of Example 12b was prepared except that dioctylphthalate plasticiser (25 parts) was also added. The resulting compound was compression moulded at 125° C. for 45 minutes to give a filled, plasticised cross-linked urethane with the following properties:

| 100% modulus | 25 Kg cm$^{-2}$ |
|---|---|
| 300% modulus | 65 Kg cm$^{-2}$ |
| Tensile strength | 318 Kg cm$^{-2}$ |
| Tear strength | 73 Kg cm$^{-1}$ |
| Elongation at break | 615% |
| Hardness | 73° (IRHD) |

We claim:

1. A polyurethane elastomer cross-linked by reaction between a cross-linking agent selected from the group consisting of sulfur and peroxides and ethylenically unsaturated groups in said polyurethane wherein the polyurethane comprises urethane linked repeating units derived from a diisocyanato-bicyclo octene having the formula:

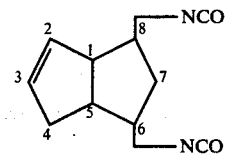

and a linear polyether or polyester prepolymer with two terminal hydroxyl groups, said ethylenically unsaturated groups being those in said bicyclo octene.

2. A polyurethane elastomer as claimed in claim 1 wherein the pre-polymer is derived to
   poly(ethylene adipate)
   poly(propylene adipate)
   poly(tetramethylene adipate)
   poly(hexamethylene adipate)
or mixtures of these polyesters.

3. A polyurethane elastomer as claimed in claim 1 and filled with a calcium carbonate, titanium dioxide or coarse silica filling material.

4. A shaped article made from a polyurethane elastomer as claimed in claim 1.

5. A shaped article as claimed in claim 4 wherein the polyurethane was cross-linked after the fabrication of the article.

6. A shaped article as claimed in claim 5 wherein the cross-linking was performed by heating the article to a temperature insufficient to cause deformation of the article.

* * * * *